United States Patent
Narayanan

(10) Patent No.: US 12,500,980 B2
(45) Date of Patent: Dec. 16, 2025

(54) INTERACTIVE VOICE RESPONSE SELECTION

(71) Applicant: Comcast Cable Communications, LLC, Philadelphia, PA (US)

(72) Inventor: Ganesh Narayanan, Tamilnadu (IN)

(73) Assignee: Comcast Cable Communications, LLC, Philadelphia, PA (US)

( * ) Notice: Subject to any disclaimer, the term of this patent is extended or adjusted under 35 U.S.C. 154(b) by 618 days.

(21) Appl. No.: 17/930,611

(22) Filed: Sep. 8, 2022

(65) Prior Publication Data

US 2024/0089374 A1  Mar. 14, 2024

(51) Int. Cl.
H04M 3/51 (2006.01)
H04L 65/1104 (2022.01)

(52) U.S. Cl.
CPC ....... *H04M 3/5166* (2013.01); *H04L 65/1104* (2022.05); *H04M 3/5191* (2013.01); *H04M 2201/40* (2013.01)

(58) Field of Classification Search
CPC ............. H04M 3/5166; H04M 3/5191; H04M 2201/40; H04L 65/1104
See application file for complete search history.

(56) References Cited

U.S. PATENT DOCUMENTS

| | | | | |
|---|---|---|---|---|
| 6,310,947 B1 * | 10/2001 | Polcyn | ................ | H04M 3/54 |
| | | | | 709/200 |
| 6,810,111 B1 * | 10/2004 | Hunter | ................ | G06F 11/3476 |
| | | | | 714/E11.2 |
| 7,016,480 B1 * | 3/2006 | Saylor | ............... | H04M 3/42153 |
| | | | | 379/88.19 |
| 7,246,062 B2 * | 7/2007 | Knott | ..................... | G10L 15/22 |
| | | | | 704/E15.04 |
| 7,940,746 B2 * | 5/2011 | Livingood | .............. | H04L 41/12 |
| | | | | 370/267 |
| 8,175,651 B2 * | 5/2012 | Rios | ........................ | G10L 15/26 |
| | | | | 455/566 |
| 8,494,126 B2 * | 7/2013 | Skinner | ............... | H04M 3/5166 |
| | | | | 379/88.23 |
| 8,842,812 B2 * | 9/2014 | Sarkar | ................ | H04M 3/5166 |
| | | | | 379/265.01 |
| 8,855,707 B2 * | 10/2014 | Seguin | .................. | G03F 7/0045 |
| | | | | 455/566 |
| 10,079,937 B2 * | 9/2018 | Nowak | ............... | H04M 3/5175 |
| 10,917,521 B1 * | 2/2021 | Koster | ............. | H04M 1/72454 |
| 11,126,747 B2 * | 9/2021 | Song | ................. | H04M 3/42059 |
| 11,722,600 B1 * | 8/2023 | Harris | ................... | H04M 3/382 |
| | | | | 379/88.18 |
| 12,063,258 B2 * | 8/2024 | Li | ......................... | H04M 3/523 |
| 2024/0089374 A1 * | 3/2024 | Narayanan | .......... | H04M 3/5166 |

* cited by examiner

*Primary Examiner* — Lisa Hashem
(74) *Attorney, Agent, or Firm* — Banner & Witcoff, Ltd.

(57) ABSTRACT

Systems, apparatuses, and methods are selecting an interactive voice response option are described. An interactive voice response system may provide a message that is associated with interactive voice response options. The interactive voice response system may provide a prompt to provide an input to select at least one of the interactive voice response options. Selection of an interactive voice response option may be based on the timing of the input. Furthermore, an action may be performed based on the interactive voice response option that corresponds to the timing of the input.

20 Claims, 10 Drawing Sheets

INTERACTIVE VOICE RESPONSE SELECTION

BACKGROUND

An interactive voice response (IVR) system may be used to automate the intake and appropriate routing of calls or service functions based on the selection of options that are presented by the interactive voice response system. Such systems may play back pre-recorded messages that include a description of an option and a number associated with the option (e.g., "Press 1 for English"). For example, when presented with a set of ten (10) options respectively associated with the numbers zero (0) through nine (9), a user may select the desired option by pressing the corresponding number on a numeric keypad. However, this task may be difficult due to a design and function of a phone, such as a small cell phone, for users who have difficulty seeing the keypad, or who have difficulty with fine motor controls, etc. Pressing small buttons on a keypad or having to move the phone to and from a listening position, may be a challenge, and may frustrate a user if they press the wrong button.

SUMMARY

The following summary presents a simplified summary of certain features. The summary is not an extensive overview and is not intended to identify key or critical elements.

Systems, apparatuses, and methods are described for an IVR system that may allow a user to provide a simple input (e.g., pressing one large button on the screen, shaking their phone, making a sound, etc.) to select from a plurality of IVR options, and the IVR system may use timing of the input to determine which IVR option was desired. It may be easier for the user to provide a simple input at a correct time, than to provide a physical input that requires fine motor controls and visual accuracy. The IVR system may comprise a computing device (e.g., a smartphone) that is configured to receive input to select IVR options based on the detection of inputs including tactile and sonic inputs. The IVR system may receive an IVR message that may be associated with information indicating a plurality of selectable IVR options, and for each IVR option, a corresponding time interval. If a user provides an input during a time interval, then the corresponding IVR option is selected. Further, the IVR message may comprise audio segments that are played back and which are associated with the time intervals and IVR options. A user may provide an input via an alternative input modality that is of a different type from the standard input modality of the IVR system (e.g., tapping the back of a handset instead of selecting an IVR option by pressing a number on a number pad). Based on a selection time associated with the time of the input and the time intervals associated with the IVR options, an action corresponding to at least one of the IVR options may be performed. The disclosed technology may provide a more convenient, efficient, and accessibility friendly way to select IVR options. Further, the disclosed technology may allow for a reduction in the number of erroneously selected IVR options.

These and other features and advantages are described in greater detail below.

BRIEF DESCRIPTION OF THE DRAWINGS

Some features are shown by way of example, and not by limitation, in the accompanying drawings In the drawings, like numerals reference similar elements.

DETAILED DESCRIPTION

Figure 1:
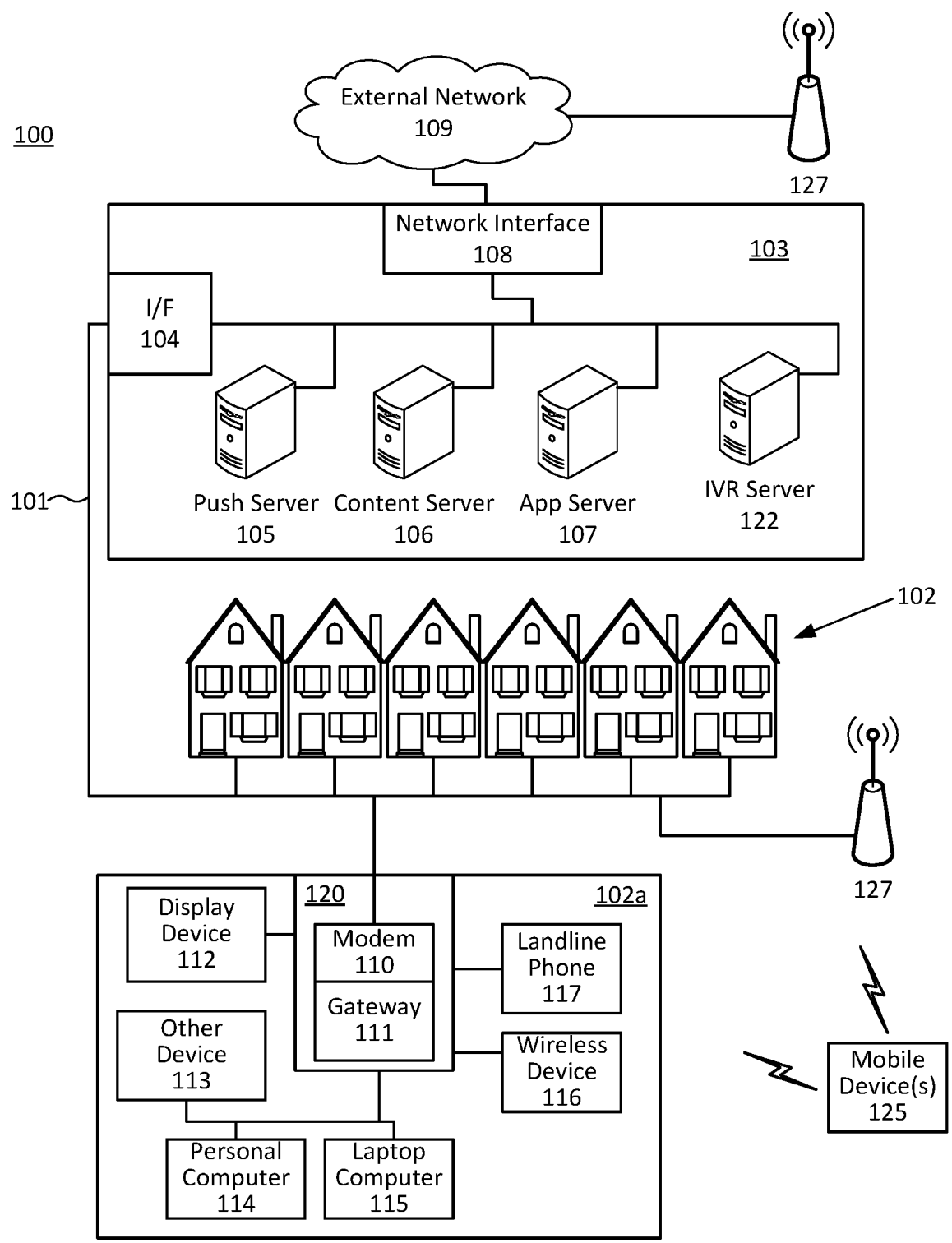
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The one or more mobile devices 125 may comprise smart phones, tablets or laptop computers with wireless transceivers, tablets or laptop computers communicatively coupled to other devices with wireless transceivers, and/or any other type of device configured to communicate via a wireless network. For example, the one or more mobile devices 125 may comprise a smartphone that is used to place a call in which communication, via the one or more external networks 109, is established between the smartphone and one or more of the servers 105-107 and IVR server 122.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The IVR server 122 may implement an IVR system that provides an IVR message to computing devices which may comprise the one or more mobile devices 125. For example, the IVR server 122 may store and/or send IVR messages that comprise audio segments to the one or more mobile devices 125 via the one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the one or more mobile devices 125 via the interface 108 and one or more of the external networks 109, e.g., via one or more of the wireless access points 127.

The push notification server 105 may be configured to generate push notifications to deliver information to devices in the premises 102 and/or to the one or more mobile devices 125. The content server 106 may be configured to provide content to devices in the premises 102 and/or to the one or more mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the one or more mobile devices 125. The local office 103 may comprise additional servers, such as the IVR server 122 (described below), additional push, content, and/or application servers, and/or other types of servers. Although shown separately, the push server 105, the content server 106, the application server 107, the IVR server 122, and/or other server(s) may be combined. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the one or more mobile devices 125, which may be on- or off-premises.

The one or more mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
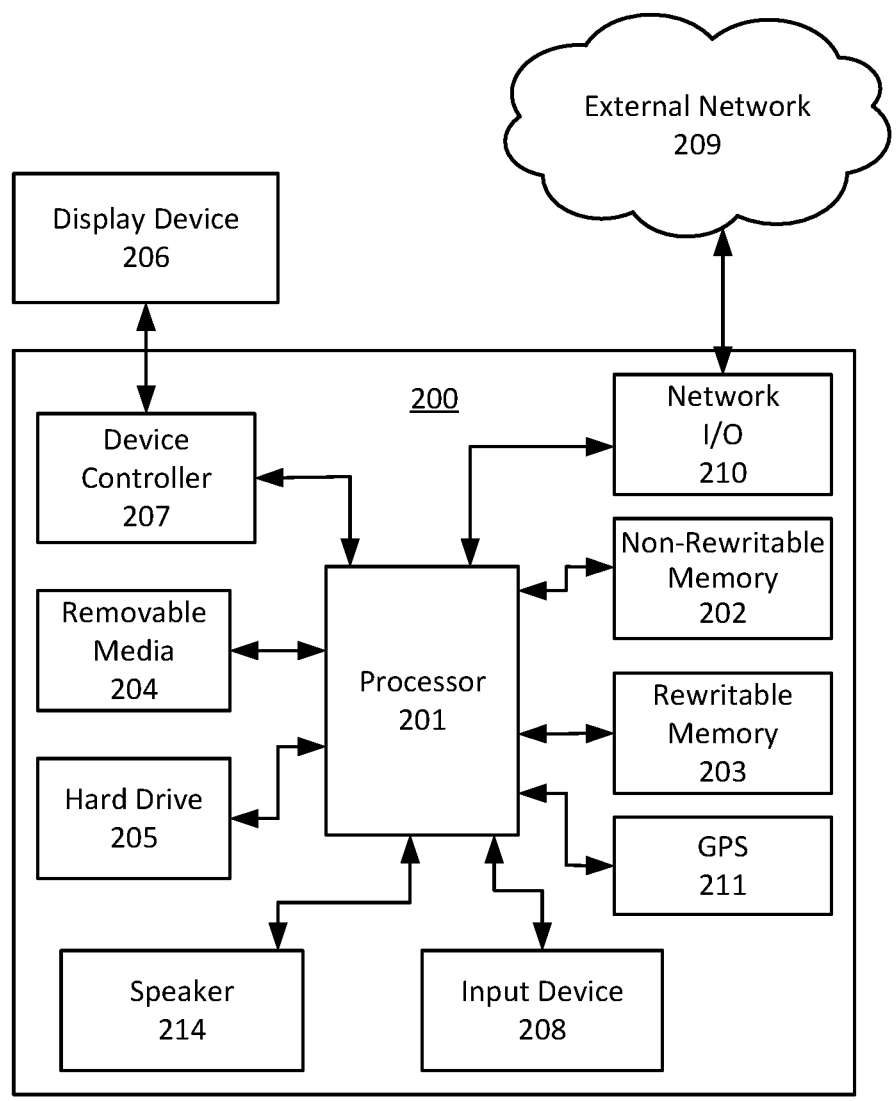
FIG. 2 shows hardware elements of a computing device.

FIG. 2 shows hardware elements of a computing device 200 that may be used to implement any of the computing devices shown in FIG. 1 (e.g., the one or more mobile devices 125, any of the devices shown in the premises 102a, any of the devices shown in the local office 103, any of the wireless access points 127, any devices with the external network 109) and any other computing devices discussed herein (e.g., the IVR server 122). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. The computing device 200 may comprise one or more user input devices 208. The one or more user input devices 208 may comprise a remote control, a keyboard, a mouse, a touch screen (which may be integrated with the display device 206), microphone, a camera, one or more buttons, etc. The computing device 200 may comprise one or more sensors. The one or more sensors may comprise a motion sensor (e.g., an accelerometer), a thermal sensor, and/or a tactile sensor. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
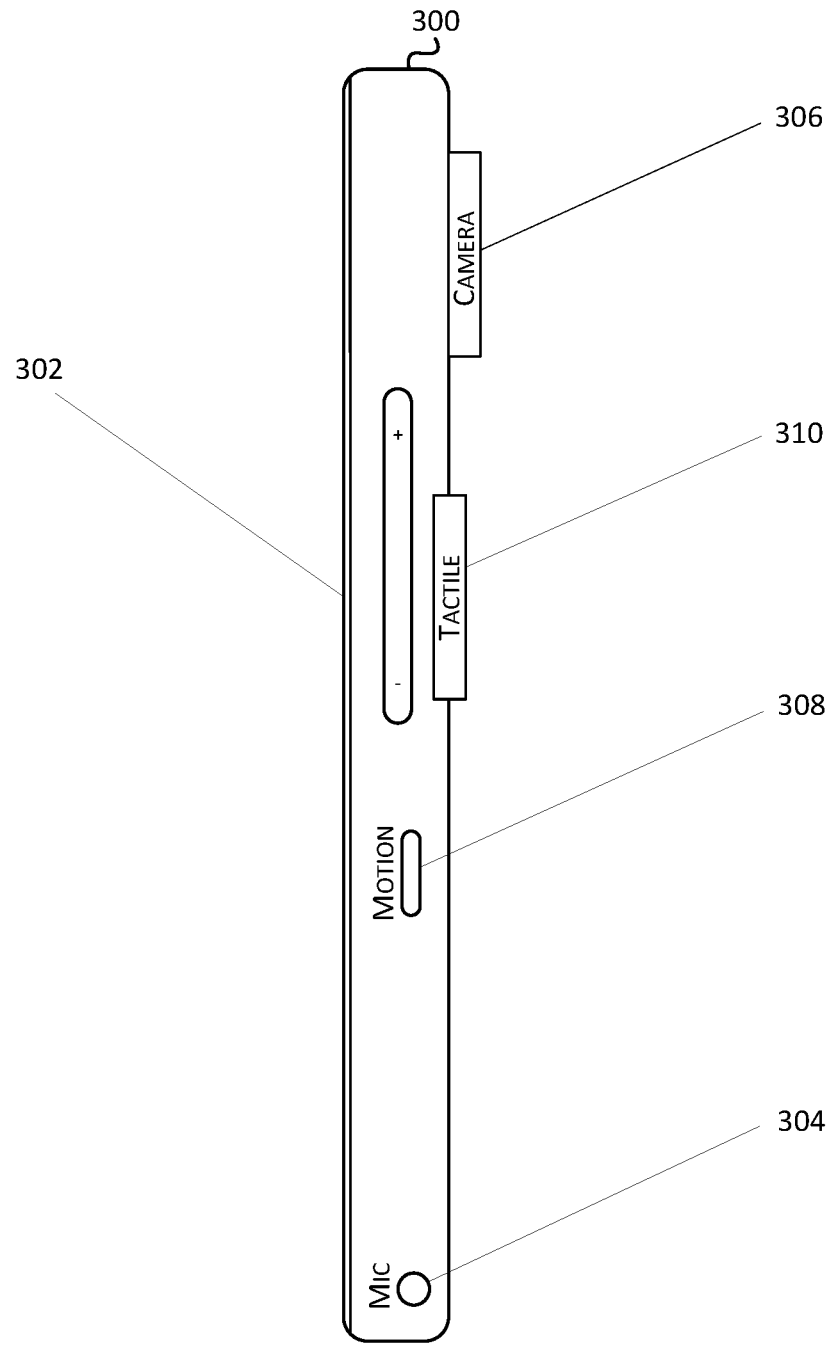
FIG. 3 shows an example of a side view of a computing device.

FIG. 3 shows an example of a side view of a computing device. The computing device 300 may be used to implement any of the computing devices shown in FIGS. 1-2 (e.g., the one or more mobile devices 125), and/or any other computing devices discussed herein.

The computing device 300 (e.g., a smartphone) may be used to receive an audio message that prompts for a user response (e.g., an IVR message, although the user response need not be a voice response, and may simply be an audio response such as the tones played by a touch-tone keypad, or any other desired type of response) and input that is used to select an option (e.g., an IVR option) that is provided in the audio message. The computing device may comprise a user interface 302 (e.g., touchscreen display) that may comprise a graphical user interface that is displayed on the surface of the user interface 302. In this example, the user interface 302 may detect and/or receive input including tactile inputs (e.g., contact by a user's finger) to select numbers of the numeric keypad that correspond to options indicated in an audio message. As will be discussed below, the computing device 300 may allow the user to select an IVR option using an alternative input of their own choosing, such as pressing a single large button, shaking the phone, tapping the phone, speaking a word, etc., at a correct time corresponding to the desired IVR option.

Further, the computing device 300 may comprise a microphone 304, and the computing device 300 may process audio from the microphone 304 to determine that the second type of input has occurred. For example, the computing device 300 may be configured to recognize the sound of a tap or knock, or to recognize a predetermined keyword or noise that a user may make to provide the second type of input that detects input. The input received by the microphone 304 may be used to select an IVR option provided in an IVR message. For example, a user may use a numeric keypad displayed in a graphical user interface of the user interface 302 to initiate a communication session with an IVR system that sends an IVR message that comprises a plurality of IVR options that are outputted via a loudspeaker of the computing device 300. The IVR message may indicate that the user may provide a first type of input to select an IVR option by pressing a number displayed on the numeric keypad of the user interface 302. Further, the computing device may be configured to receive a second type of input and select an IVR option based on a time the second type of input was detected by the microphone 304 (or a different sensor). The computing device 300 may use the time at which the second type of input is detected to determine the IVR option that was selected, by mapping different time portions of the IVR message to the different IVR options.

The computing device 300 may determine the occurrence of a tap, knock, or sound based on various types of sensors. The one or more sensors of the computing device 300 may comprise a camera (e.g., a visible light spectrum camera and/or an infrared camera that detect a user's finger providing the second type of input or a gesture by the user that is interpreted as a second type of input), a motion sensor (e.g., an accelerometer that detects shaking, tapping, or knocking), a thermal sensor (e.g., a thermal sensor that detects heat from a user's finger), a tactile sensor (e.g., a capacitive touch sensor and/or a resistive touch sensor that may detect a user pressing the tactile sensor), and/or a microphone (e.g., a microphone that detects the sound of a user tapping or knocking on the computing device 300).

The computing device 300 may comprise a camera 306, and the computing device 300 may process an image from the camera 306 to determine that the second type of input has occurred. For example, a camera image may shake when a user taps the computing device 300, and the computing device 300 may determine that the shaking of the camera image indicates a tap.

The computing device 300 may comprise a motion sensor 308 (e.g., an accelerometer) that is configured to detect movement of the computing device 300. For example, the motion sensor 308 may detect when the computing device 300 moves in certain ways (e.g., the computing device 300 moves in a way that corresponds to the computing device 300 being tapped, knocked, and/or shaken), and the computing device 300 may determine that the motion is a tap, knocked, or shaken.

The computing device 300 may comprise a tactile sensor 310 (e.g., a resistive or capacitive sensor) that is configured to detect force and/or pressure. For example, the computing device 300 may process sensor output that is generated by the tactile sensor 310 when a finger is tapping the tactile sensor 310 based on changes (e.g., an increase in the amount of force) in the amount of force that is applied to the tactile sensor 310.

Figure 4:
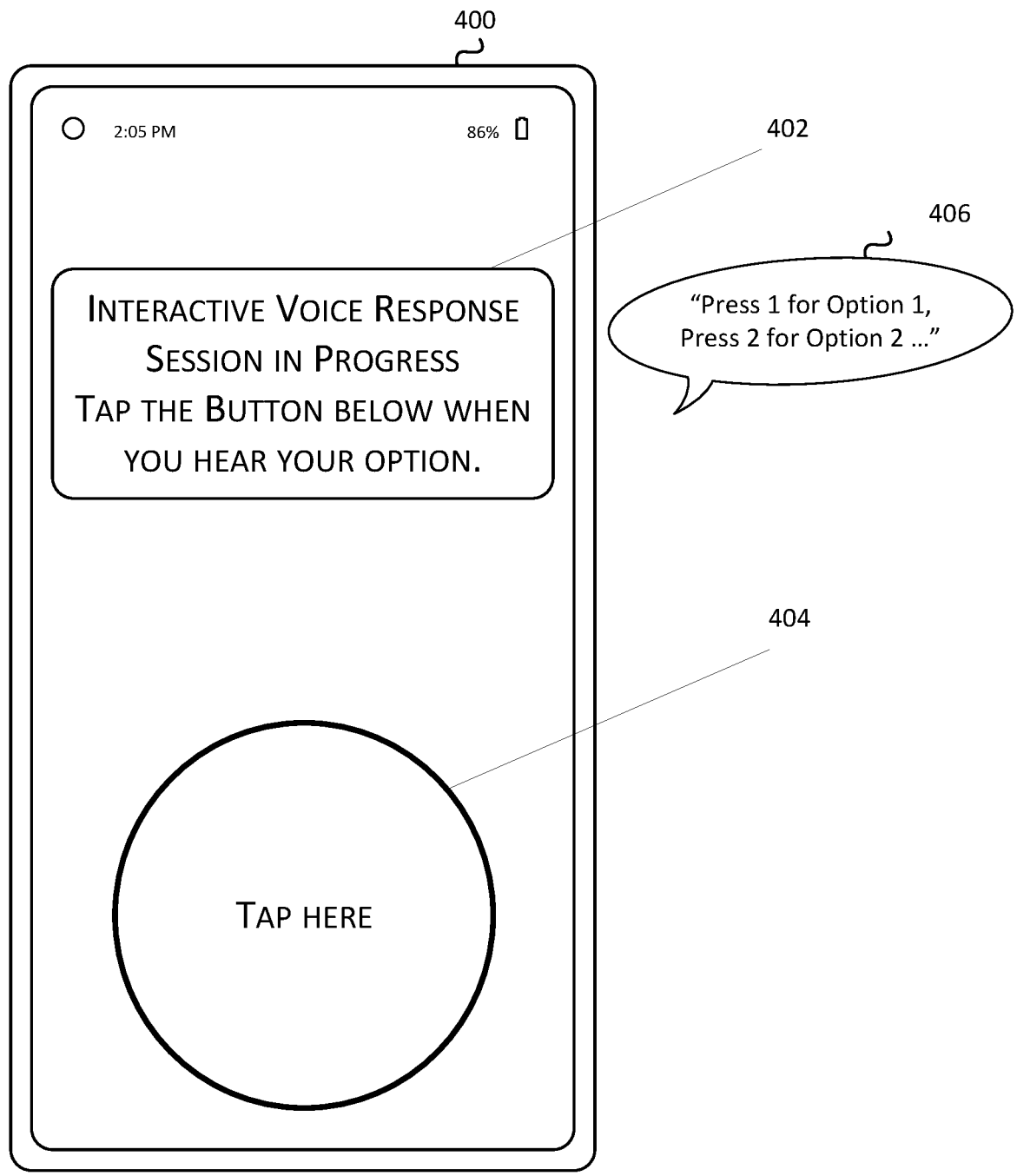
FIG. 4 shows an example of a front view of a computing device.

FIG. 4 shows an example of a front view of a computing device that provides a user with an easy way to make a selection from an IVR message. The computing device 400 may be used to implement any of the computing devices shown in FIGS. 1-3 (e.g., the one or more mobile devices 125), and/or any other computing devices discussed herein.

The computing device 400 may display a user interface that includes an interface element 402 and an interface element 404. The interface element 402 may comprise written instructions that may correspond to the audio segments 406 which are part of the IVR message that is outputted by the computing device 400. The instructions in the interface element 402 may indicate instructions for a user including the first type of input (e.g., pressing a number on a numeric keypad) that may be used to select an IVR option provided in the IVR message. For example, the instructions in the interface element 402 may indicate "INTERACTIVE VOICE RESPONSE SESSION IN PROGRESS TAP THE BUTTON BELOW WHEN YOU HEAR YOUR OPTION." The interface element 404 may comprise an image (e.g., a circle) which may comprise an instruction (e.g., "TAP HERE"). The computing device 400 may comprise tactile sensors and an IVR option may be selected based on the detection of a second type of input in which the interface element 404 is tapped.

The audio segments 406 that are outputted by the computing device 400 may indicate IVR options that may be selected based on the time at which a second type of input to the interface element 404 is detected. The audio segments 406 may provide IVR options in an IVR message that indicates "PRESS 1 FOR OPTION 1, PRESS 2 FOR OPTION 2 . . . " If the user does not wish to navigate numeric touch buttons on their phone, the user may choose to use an alternative input, and simply press the interface element 404 at the correct time to make a selection from the options in the IVR message. For example, by pressing the interface element 404 while the IVR message is saying "PRESS 1 FOR OPTION 1," the device 400 may treat the button press as a selection of Option 1, even if the user has not pressed the numeric button "1". This may be particularly useful if the user has difficulty seeing smaller icons on the screen of their device 400, or if the user's finger dexterity makes it difficult to accurately press a small button. The interface element 404 may be as large as the user desires, and the user need only press that interface element 404 at the correct time in order to make their desired selection.

Figure 5:
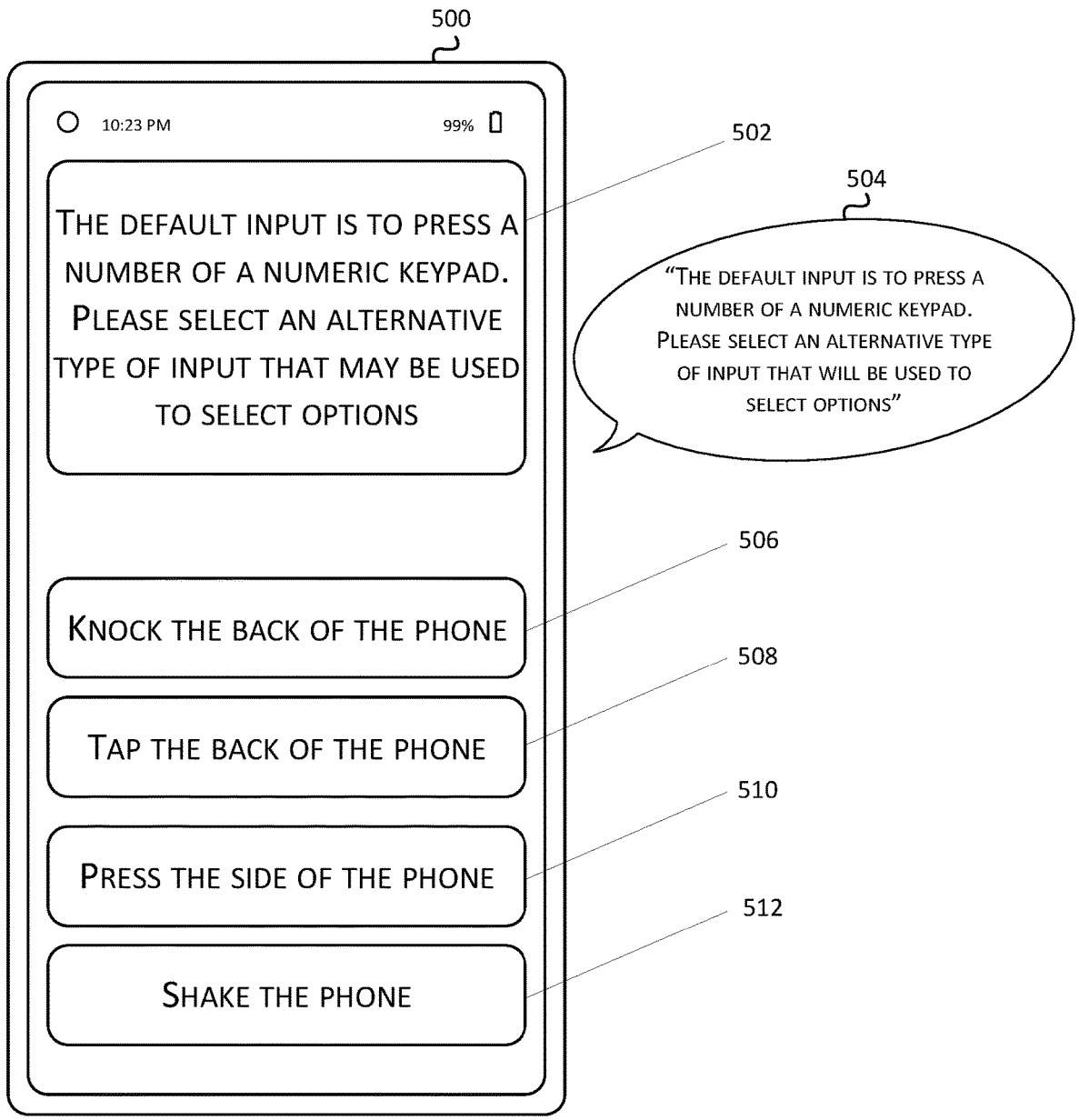
FIG. 5 shows an example of a front view of a computing device.

FIG. 5 shows an example of a front view of a computing device that provides a user with alternative types of input that may be used to select options. The computing device 500 may be used to implement any of the computing devices shown in FIGS. 1-4 (e.g., the one or more mobile devices 125), and/or any other computing devices discussed herein.

The computing device 500 (e.g., a smartphone) may display a user interface that includes an interface element 502 comprising written instructions that may correspond to the audio message 504 that is outputted (e.g., played back through loudspeakers) by the computing device 500. The interface element 502 may indicate instructions prompting a user to select an alternative type of input that may be used to select an IVR option provided in an IVR message. For example, the instructions in the interface element 502 may indicate "THE DEFAULT INPUT IS TO PRESS A NUMBER OF A NUMERIC KEYPAD. PLEASE SELECT AN ALTERNATIVE TYPE OF INPUT THAT MAY BE USED TO SELECT OPTIONS." The interface elements 506-512 may indicate different types of alternative inputs that a user may use when selecting an IVR option indicated in an audio message. The computing device 500 may comprise tactile sensors and one or more of the alternative types of input may be selected based on the user touching one or more of the interface elements 506-512.

The interface element 506 indicates "KNOCK THE BACK OF THE PHONE" which if selected by a user will allow a user to select an IVR option by knocking the back of the computing device 500. The interface element 506 indicates "TAP THE BACK OF THE PHONE" which if selected by a user will allow a user to select an IVR option by tapping (e.g., tapping with a finger) the back of the computing device 500. The interface element 508 indicates "PRESS THE SIDE OF THE PHONE" which if selected by a user will allow a user to select an IVR option by pressing or squeezing the side or sides of the computing device 500. The interface element 506 indicates "SHAKE THE PHONE" which if selected by a user will allow a user to select an IVR option by shaking the computing device 500. The alternative type of input selected by the user may facilitate the user's selection of an IVR option. Further, preconfiguring the user's alternative type of input improves the efficiency of an IVR call by not requiring the user to configure their preferred type of input at the time of the call.

Figure 6A:
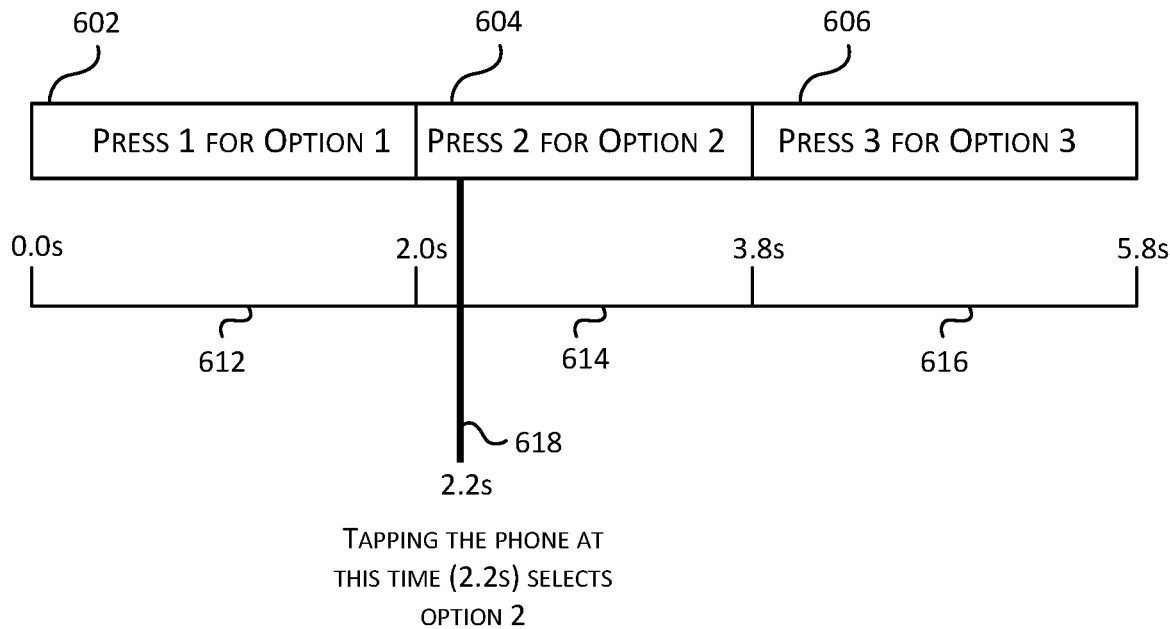
FIGS. 6A and 6B show examples of selecting interactive voice response options.
Figure 6B:
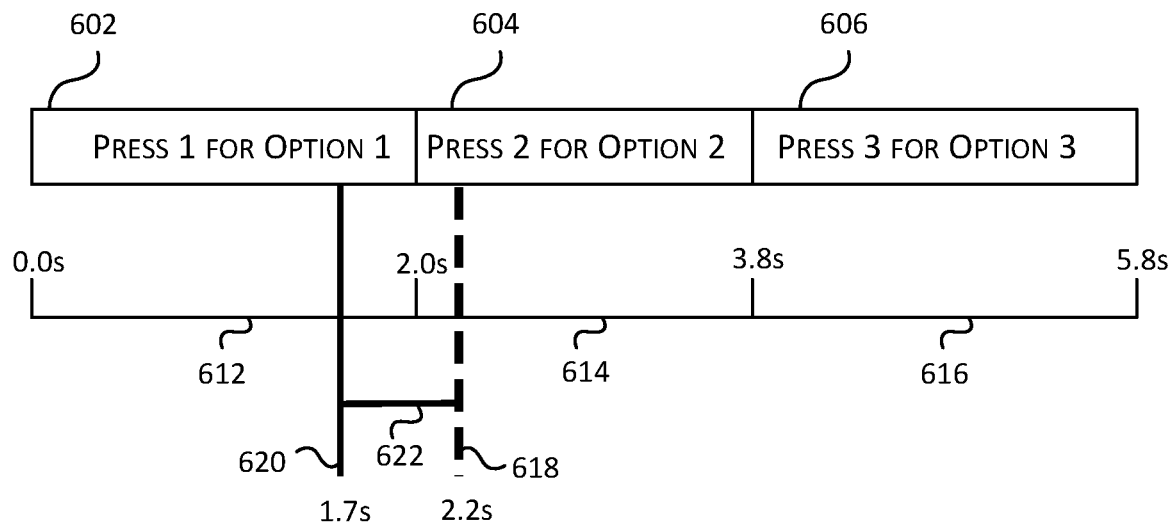

FIGS. 6A-6B show examples of selecting interactive voice response options. These options may be used by any device described herein, such as the one or more mobile devices 125. The audio segments 602-606 shown in FIGS. 6A and 6B may be part of an audio message that is output by a computing device. For example, the audio segments 602-606 may be output via an audio output device of the computing device. The audio segments 602-606 may correspond to IVR options that may be associated with performance of an action (e.g., connecting a voice call to an operator based on an input to select the corresponding IVR option). In this example, the audio segment 602 indicates "PRESS 1 FOR OPTION 1" and corresponds to a first IVR option, the audio segment 604 indicates "PRESS 2 FOR OPTION 2" and corresponds to a second IVR option, and the audio segment 606 indicates "PRESS 3 FOR OPTION 3" and corresponds to a third IVR option.

The time intervals 612-616 shown in FIGS. 6A and 6B are represented as part of a timeline comprising the time intervals 612-616 which are sequential and contiguous, with the time interval 612 being first, the time interval 614 being second and immediately following the time interval 614, and the time interval 616 being third and immediately following the time interval 616. The audio segment 602 may have a duration of two (2.0) seconds which is represented by the time interval 612 on the timeline, the audio segment 604 may have a duration of 1.8 seconds which is represented by the time interval 614 on the timeline, and the audio segment 606 may have a duration of two (2.0) seconds which is represented by the time interval 616 on the timeline. In FIG. 6A, the time of input time 618 may represent a time that an input to select the IVR option (e.g., Option 2) corresponding to the audio segment 604 was detected and/or received by the computing device. For example, input time 618 may indicate that a user pressed the interface element 404 at a time of 2.2 seconds, and that pressing the interface element 404 within time interval 614 may result in the selection of Option 2.

Sometimes there may be a delay between when a user tries to make their selection and when a signal for input time 618 is actually received, and the actual time of their input time 618 might be a bit later than when they actually intended it to be. This delay may be for a variety of reasons, such as reaction time of the user, latency associated with the computing device, delays associated with the communication network that is used to transmit the input, etc. For such situations, after the time of input time 618 shown in FIG. 6A is determined, a selection time 620 shown in FIG. 6B, may be determined by adjusting the input time 618 by an offset 622. The offset 622 may account for a reaction time offset (e.g., the time the user needs to read/understand the options and make a selection) and/or a latency offset (e.g., processing time and transmission time for recognizing the input to the interface element 404, signaling that input to a processor, and processing it). For example, it may be determined that the user generally (e.g., from user input information, a user profile, etc.) has a 0.3 second delay when deciding which IVR option to select, and that the user's computing device may require 0.2 seconds to receive/process an input. As a result, if the input time 618 represents the time the system finally received the indication of the user's selection, the actual selection may have been made 0.5 seconds earlier than input time 618. So the selection time 620 may be 1.7 seconds, which is 0.5 seconds earlier than input time 618, and selection time 620 may actually be used for making the IVR selection (e.g., selection time 620 is within time interval 612, so the system may treat this as the user selecting Option 1, even if input time 618 was received in the time interval 614 for Option 2).

Figure 7:
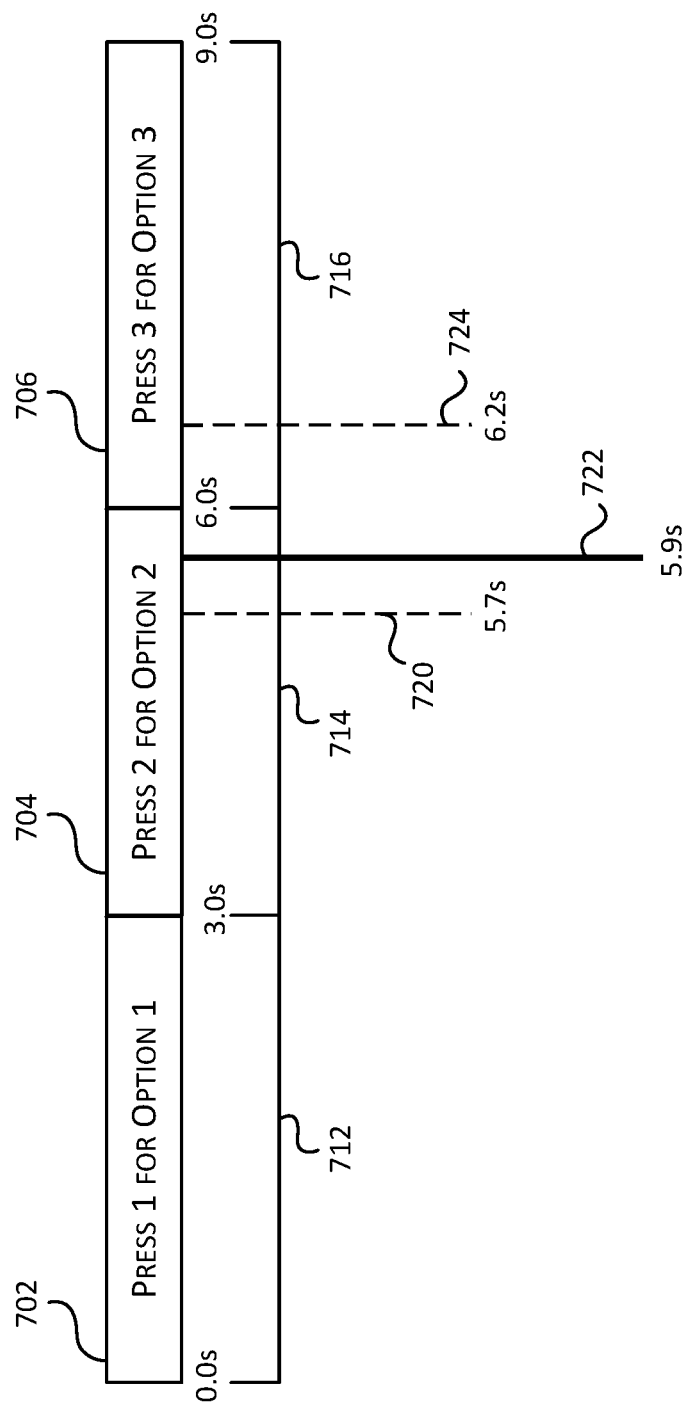
FIG. 7 shows an example of selecting interactive voice response options.

Some users may have difficulty with fine motor control, and their hands may shake such that when they try to press the interface element 404 (or provide some other input like pushing a button, touching a touch-sensitive area, etc.), their finger may actually press the interface element 404 several times. FIG. 7 shows an example in which an IVR selection may be made based on a plurality of received inputs. Like FIG. 6, the steps may be performed by any device described herein, such as the one or more mobile devices 125.

In this example, the user may have touched the interface element 404 twice in rapid succession, providing a first input 720 and a second input 724. The first input 720 and the second input 724 may be provided as part of selecting an IVR option that is indicated in an IVR message that is output via an audio output device of the computing device.

The first input 720 may have occurred during a time interval 714 that corresponds to Option 2, while the second input 724 may have occurred during a time interval 716 that corresponds to Option 3. To interpret these inputs and make a selection, the system herein may average the times of the inputs 720/724, resulting in a selection time 722 that is determined. This selection time 722 that was determined is within the time interval 714 corresponding to Option 2, so the user's inputs 720-724 may be interpreted as a selection of Option 2. If desired, the offset times discuss above may also be used, to further adjust the selection time 722 before determining the option that was selected. For example, if the first input 720 was received at a time of 5.6 seconds into the IVR message, and the second input 724 was received at a time of 6.2 seconds, the selection time 722 may be determined to be an average of the times—resulting in a selection time 722 of 5.9 seconds. In this example, the time interval 714 ends at a time of 6.0 seconds and the time interval 716 begins immediately after the time interval 714. As a result, in this example, the selection time 722 may be determined to correspond to the time interval 714 which corresponds to the IVR option 704 (Option 2). The selection time 722 may result in determining that the user has selected Option 2. Further, the selection of Option 2 may result in a signal being sent to a help desk. The signal indicate that Option 2 was selected and may cause an IVR system than receives the message to transfer the call to the help desk.

Figure 8:
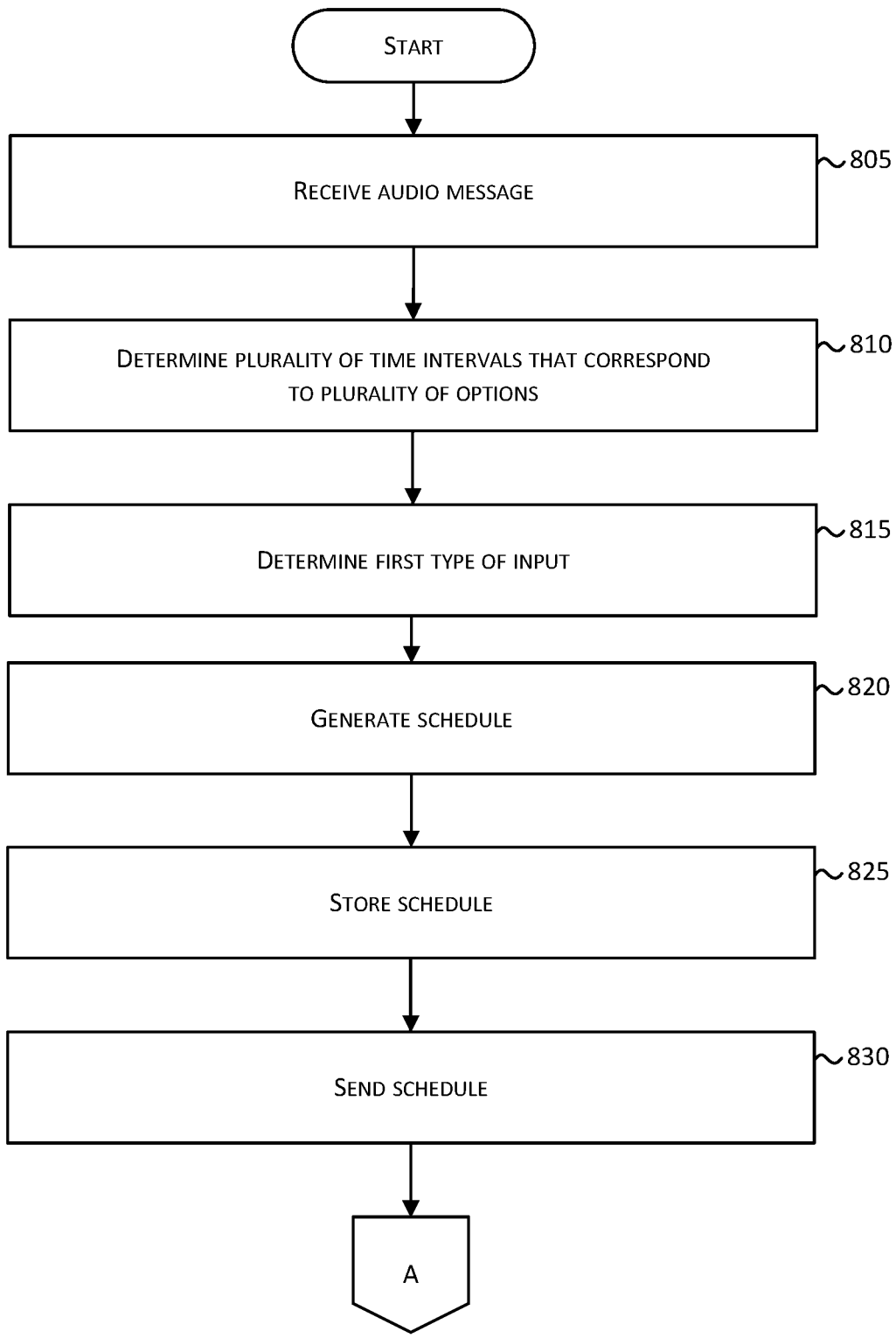
FIG. 8 is a flow chart showing an example method for generating a schedule for interactive voice options.

FIG. 8 is a flow chart showing an example method for generating a schedule for interactive voice options. The steps of the method 800 may be used to generate a schedule that facilitates alternative inputs being provided when an audio message of an IVR system is received. The steps of the example method 800 may be performed by any device described herein, including one or more mobile devices 125. Further, any part of the steps of the method 800 may be performed as part of the method 900, the method 1000, and/or the method 1100. One, some, or all steps of the example method 800 may be omitted, performed in other orders, and/or otherwise modified, and/or one or more additional steps may be added.

In step 805, an audio message comprising indications of a plurality of options that are selectable via an input may be received (e.g., received by an IVR system such as the IVR server 122). The audio message (or data associated with the audio message) may comprise an indication of a plurality of options that are selectable via a first type of input. For example, the audio message may comprise an audio recording that indicates a set of options that are available to a user that calls a help desk. Further, the audio message may be accompanied by data that indicates that the plurality of options are selectable by providing a particular first type of input (e.g., pressing a numeric keypad) that may correspond to the plurality of options. For example, as shown in FIG. 4, the audio message may indicate that pressing "1" on a numeric keypad of the computing device that receives the audio message may select a first option and that pressing "2" on the numeric keypad may select a second option. Further, the audio message may be received from an IVR system that sends the audio message as a result of being contacted. For example, a computing device may receive the audio message after placing a call to a call center that sends the audio message when an IVR system of the call center answers the telephone call.

The audio message may be accompanied by metadata indicating the first type of input that the message prompts a user to make. For example, the audio message may comprise metadata indicating that the user will be asked to make a selection by pressing a number on a numeric keypad, such that a dual-tone multifrequency (DTMF) tone is played over the audio to indicate the user's selection. This indication of the first type of input may allow the user's device 300, 400 to understand what sort of output is needed to indicate the user's selection (e.g., outputting a DTMF tone). The user's device 300, 400 may translate the second type of input to the required output, based on the timing of the user's entry of the second type of input. For example, if the first type of input is a numeric input to a keypad of a computing device (e.g., a mobile device 125), the second type of input may be a tap on some portion of the computing device that is not the keypad, and the computing device may provide the necessary output as if the user had made the selection using the first type of input.

Further, the audio message may comprise an indication that selection of one of the plurality of options may be based on a time that an input is received and/or that one of the plurality of options may be selected based on receiving an input during a time interval when the option is being outputted. For example, the audio message may indicate that one of the plurality of options may be selected by knocking on the front of the computing device during a time when the option the user wishes to select is outputted (e.g., "KNOCK ON YOUR DEVICE WHEN YOU HEAR THE OPTION YOU WISH TO SELECT").

In step 810, based on the audio message, a plurality of time intervals that correspond to the plurality of options may be determined. For example, the audio message may comprise one or more (brief 1.0 second) time intervals of silence between the indications of the plurality of options of the audio message. A computing device that determines the plurality of time intervals that correspond to the plurality of options may be configured to determine that the plurality of options correspond to the plurality of time intervals that follow or precede the plurality of time intervals of silence. The computing device may use an audio segmentation technique by applying the audio segmentation technique to the audio message to segment the audio message into a plurality of audio segments that correspond to the plurality of options. Further, the plurality of time intervals that correspond to the plurality of audio segments may be determined (e.g., the plurality of time intervals may be determined based on the duration and/or order of the plurality of audio segments). For example, the computing device may use a machine learning model that is able to recognize the content of the audio message and determine that an initial portion of the audio message that indicates "PRESS ONE FOR THE FRONT DESK" is a segment that corresponds to a first option and first time interval and that the subsequent portion of the audio message that indicates "PRESS TWO FOR ROOM SERVICE" is a segment that corresponds to a second option and second time interval. Further, the computing device may use a silence detection technique by applying the silence detection technique to the audio message to detect audio segments of the audio message that are quieter than other audio segments of the audio message, which may indicate the separation between different options indicated in the audio message. For example, the audio message may comprise a one second period of silence or quiet (e.g., an amplitude below a threshold amplitude) between the indications of the plurality of options. The computing device may determine that the segments of the audio message before and/or after the one second pause are options.

In step 815, a first type of input that is indicated for use in selecting the plurality of options may be determined. The computing device may determine an expected or default type of input that is indicated in the audio message. The computing device that places a call to an IVR system may then receive a schedule indicating the first type of input and may use an alternative type of input (e.g., a second type of input). The computing device may use a speech recognition technique to determine the first type of input that is indicated in the audio message. For example, the computing device may use a machine learning model that is configured to recognize the content of the audio message and determine that the portion of the audio message that indicates "PRESS ONE ON THE KEYPAD FOR ACCOUNTING" is an indication that that the first type of input is a tactile input to a keypad. Further, if the audio message comprises metadata indicating the first type of input, the computing device may determine the first type of input by accessing the metadata. For example, if the audio message comprises metadata indicating that the first type of input is a voice input (e.g., a user announcing "option one" to select option one) via a microphone, the computing device may determine that the first type of input is a voice input via a microphone.

In step 820, a schedule (e.g., an IVR schedule) may be generated. The schedule may indicate the plurality of time intervals corresponding to the plurality of options of the audio message. Further, the schedule may associate the plurality of time intervals to (or with) different options of the plurality of options that correspond to the plurality of time intervals. For example, an audio message may indicate a first option corresponding to a first time interval beginning at 0.0 seconds and ending at 4.0 seconds of the audio message, and a second option corresponding to a second time interval beginning at 4.0 seconds and ending at 10.0 seconds of the audio message. The schedule may indicate the association between: the first option and the first time interval; the second option and the second time interval; the order of the first option (e.g., before the second option) and first time interval (e.g., before the second time interval); the order of the second option (e.g., after the first option) and the second time interval (e.g., after the first time interval); and the durations of the first time interval and the second time interval.

Further, the schedule may indicate the manner in which the option selection is supposed to be indicated back to the IVR (e.g., the IVR server 122) system in a call. For example, the DTMF signaling protocol assigns predetermined audio tones to the buttons (0-9, #, and *) on a standard telephone keypad. If the audio message prompts users to make selections by pressing telephone keypad buttons to produce those tones, then the IVR system playing that audio message will be listening for the corresponding DTMF tone (e.g., DTMF signal) to indicate a user's selections. The schedule may include information indicating which DTMF tones correspond to which IVR options. A computing device (e.g., mobile device 125) that receives the schedule may use this information to determine how it should respond when its user makes a selection via the user's desired second type of input. For example, if the user wishes to shake the computing device instead of pressing a number button, the computing device may detect the shake, determine which time interval the shake occurred in, determine the IVR option that corresponds to that time interval, and then play the DTMF tone corresponding to that IVR option. The schedule may inform the computing device as to how the user's selection should be signaled back to the IVR system handling the call.

Generation of the schedule may comprise mapping the plurality of different time intervals to the plurality of options. For example, if an audio message comprises indications of three (3) options, the options may be mapped to three corresponding time intervals, with each time intervals starting at the beginning of each option and ending at the end of each option that is indicated. Further, each of the plurality of options may correspond to a plurality of different DTMF signals (e.g., DTMF tones) and the schedule may indicate a mapping of a plurality of different time intervals of an audio message to a plurality of different DTMF signals. For example, the first option and first corresponding time interval may correspond to a DTMF signal for the number one, the second option and second corresponding time interval may correspond to the DTMF signal for the number two, and the third option and third corresponding time interval may correspond to the DTMF signal for the number three. The schedule may include a mapping of the time interval to a corresponding time interval of the plurality of time intervals such that the second time interval corresponding to the second option may correspond to the DTMF signal for the number two.

Further, the schedule may comprise an indication of the corresponding audio message. For example, if an audio message has a file name "AUDIO MESSAGE 2008-02-05-1023" the file name of the audio message may be included in the schedule so that the schedule may be retrieved and sent when the corresponding audio message is sent.

In step 825, the schedule may be stored. For example, the schedule may be stored for future use, then retrieved and sent when an audio message corresponding to the schedule is sent. If the audio message is updated, the schedule that is stored may be updated with a new schedule that corresponds to the updated audio message. For example, if an audio message is updated, a new schedule may be generated for the updated audio message, the previous audio message and schedule may be deleted, and the updated audio message and schedule may be used in place of the previous audio message and schedule.

In step 830, the schedule may be sent to a computing device that outputs the audio message or has initiated a communication session with an IVR system (e.g., a computing device that has called an IVR system). For example, a computing device (e.g., mobile device 125) may place a telephone call or use an application (e.g., a customer support application or web service) to initiate a communication session between an application on the computing device and an IVR system (e.g., IVR server 122). Initiation of the communication session may cause the IVR system to send a schedule corresponding to the telephone number or application option that is indicated during the communication session. This may occur, for example, as part of a session initiation protocol (SIP) signaling exchange used to place a voice over Internet Protocol (VoIP) call. For example, if a telephone number for a particular businesses help desk is dialed, the IVR system may send the schedule and audio message that correspond to the telephone number of the help desk. After receiving the audio message and the schedule, the computing device may execute an application that uses the schedule to determine an option that is selected via a second input when the audio message is output on the computing device, and to send the appropriate corresponding signal to indicate the selection of that option.

Figure 9:
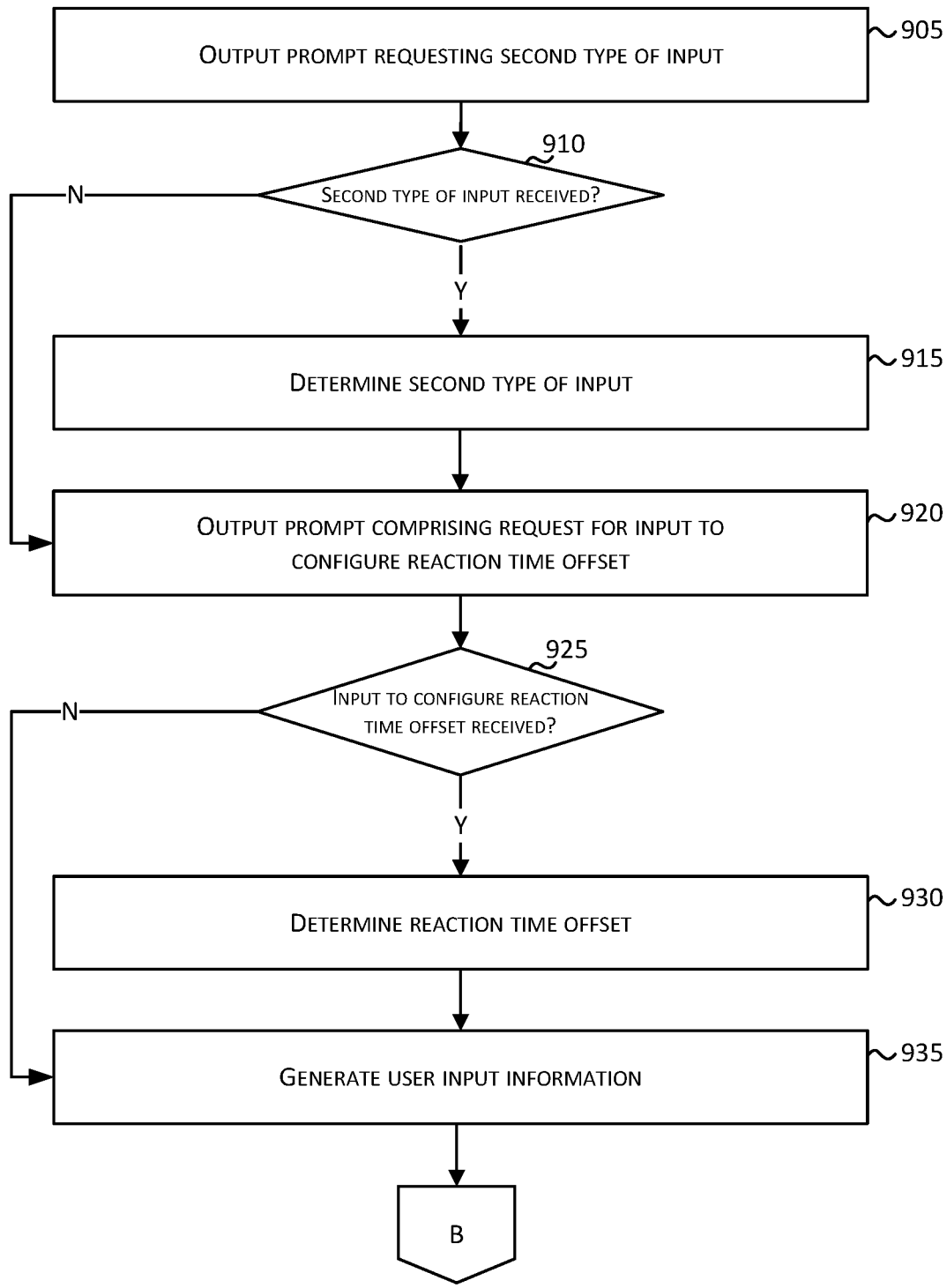
FIG. 9 is a flow chart showing an example method for configuring input for interactive voice response options.

FIG. 9 is a flow chart showing steps of an example method 900 for configuring input for interactive voice response options. The steps of the method 900 may be used to improve the user experience of an IVR session by allowing a user to select an alternative type of input for the IVR session and account for differences in user reaction times. The steps of the example method 900 may be performed by any device described herein, including one or more mobile devices 125. Further, any part of the steps of the method 900 may be performed as part of the method 800, the method 1000, and/or the method 1100. One, some, or all steps of the example method 900 may be omitted, performed in other orders, and/or otherwise modified, and/or one or more additional steps may be added. For example, the FIG. 9 steps may begin with a user requesting to configure their mobile device to support alternative IVR message responses.

In step 905, a prompt comprising a request for input to configure a second type of input to select an option in an audio message (e.g., an audio message sent from an IVR system) may be outputted. Further, the prompt may comprise an indication of a first type of input that is different from the second type of input. For example, an application that is executed on a computing device (e.g., mobile device 125) may output a textual prompt via a display of the computing device. As in the interface element 502, the prompt may indicate "THE DEFAULT INPUT IS TO PRESS A NUMBER OF A NUMERIC KEYPAD. PLEASE SELECT AN ALTERNATIVE TYPE OF INPUT THAT WILL BE USED TO SELECT OPTIONS" and present the user with a selection of different types of input (e.g., the alternative types of input indicated in the interface elements 506-512) that may be used as an alternative to input types that are selected by IVR messages. The inputs that the prompt indicates may be used as a second type of input may, for example, include knocks, taps, presses, and/or shaking which may be directed to different portions of a computing device, and may be an alternative to DTMF tones that would occur if an IVR message prompted the user to press numeric keys on a telephone keypad. For example, the prompt outputted to the display may include a list including pressing a large graphical button, tapping the back of a computing device, pressing a volume button on the side of a computing device, or shaking the computing device.

In step 910, based on receiving input to configure the second type of input, step 915 may be performed. For example, a computing device (e.g., the mobile device 125) may comprise one or more sensors that may be used to detect an input to select one or more of the alternative types of input indicated in step 905. Further, the input to configure the second type of input may comprise the second type of input. For example, if the second type of input is shaking the computing device, the second type of input may be determined to be received if the input to configure the second type of input comprises shaking the computing device. Based on the second type of input not being received (e.g., the second type of input not being detected), a default second type of input may be determined to have been received and step 920 may be performed. Further, the default second type of input may comprise the input that would have been used to configure the second type of input. For example, if the prompt indicates that touching a touch screen of a computing device that outputs the prompt may be used to configure the second type of input, and no input to configure the second type of input is provided, then touching the touch screen may be determined to be the second type of input.

In step 915, the second type of input may be determined. For example, a user may select a second type of input from the prompt (e.g., the list of inputs) displayed in step 905 by pressing the second type of input the user would like to use with their finger. Multiple second types of input may be selected and any of the second types of input may be used to provide an input to select an option indicated in an audio message. For example, if a user selected tapping the back of the computing device (e.g., mobile device 125) and pressing a volume button of the computing device, either input may be used to select an option indicated in an audio message.

The second type of input may comprise a tactile input to (e.g., knocking, rubbing, or tapping) a portion of the computing device that is different from a portion of the computing device that is used to receive the first type of input. For example, in FIG. 3 the input to the user interface 302 (e.g., the first type of input) on the front of the computing device is detected at a different portion of the computing device from the input to the tactile sensor 310 which is on the back of the computing device.

The second type of input may be determined based on a user performing the second type of input. Further, the second type of input may be determined based on a user providing the second type of input to one or more sensors that are configured to detect the second type of input. For example, after the prompt requesting the second type of input is played back in step 905, if a user squeezes the side of a computing device (e.g., the mobile device 125) or taps the back of the computing device, the second type may be determined to be the squeeze on the side of the computing device or the tap on the back of the computing device.

In step 920, a prompt comprising a request for input to configure a reaction time offset for the second type of input may be outputted. For example, an application that is executed on a computing device (e.g., a mobile device 125) may output an audio prompt via a loudspeaker of the computing device. The prompt may indicate "TO CONFIGURE A REACTION TIME OFFSET PLEASE TAP THE SCREEN WHEN YOU HEAR THE TONE" and may be followed by a tone (e.g., a beep or chime). Further, the prompt may include a textual representation of the prompt that may be displayed either in lieu of the audio prompt or at the same time as the audio prompt.

In step 925, based on at least one time at which the second type of input was received, step 930 may be performed. For example, a computing device (e.g., the mobile device 125) may comprise one or more sensors that may be used to detect an input (e.g., the input to configure the reaction time offset) to the one or more sensors was received. Further, the computing device may determine (e.g., using a timer) at least one time at which the second type of input was received. Based on a determination that the input to configure the reaction time offset was not received, a default reaction time offset may be determined (e.g., a reaction time offset of 200 milliseconds or 500 milliseconds may be determined) and step 935 may be performed.

In step 930, a reaction time offset time may be determined. For example, a computing device (e.g., mobile device 125) may include one or more sensors that may detect an input from a user responding to the prompt requesting the input to configure the reaction time offset. The one or more sensors may comprise a tactile sensor, capacitive sensor, resistive sensor, accelerometer, microphone, and/or image sensor. Further, the one or more sensors may be configured to detect input comprising taps, knocks, and/or pressure. For example, as shown in FIG. 4, a capacitive sensor on a display of a mobile device 125 may detect a finger tapping the interface element 404 on the user interface of the computing device 400. The mobile device 125 may determine the reaction time offset based on the duration between the time of the prompt outputted at step 920 and the time the input was received in step 925.

Further the reaction time offset may be associated with the user of computing device (e.g., the user of a mobile device 125) and may correspond to a delay in a user's response to the prompt (e.g., the amount of time it takes a user to respond to the prompt). Further, the reaction time offset may be based on a duration between a time the prompt was outputted and a time the input to configure the reaction time offset was received. For example, a timer measuring the reaction time offset may start timing at a time corresponding to the tone being outputted at the end of the prompt and stop timing at a time when the input to configure the reaction time offset is detected.

Different users may have different reaction times such that there may be different delays, and different reaction time offsets, in the time it takes for a user to provide an input to select one of the plurality of options indicated in an audio message. To account for such differences, the reaction time offset may be used in the determination of the selection time. Slower reaction times may be associated with greater reaction time offsets and faster reaction times may be associated with smaller reaction time offsets. For example, a user that is relatively quick to provide input may have reaction time information comprising a reaction time offset of less than 0.1 seconds. In contrast, a user that is relatively slow to provide an input may have reaction time information comprising a reaction time offset of 0.5 seconds.

The input to configure the reaction time offset may comprise a plurality of inputs (e.g., tactile inputs). Further, the reaction time offset may be determined by using a mean, mode, or median of the plurality of inputs that are received. For example, if three inputs of 0.2 seconds, 0.5 seconds, and 0.9 seconds are received, the reaction time offset may be based on the median input of 0.5 seconds. Further, the reaction time offset may be based on an average of a duration between the plurality of tactile inputs. For example, a reaction time offset of 0.4 seconds may be determined based on an average of three inputs in which there is a duration of 0.3 seconds between the first input and the second input, and a duration of 0.5 seconds between the second input and the third input.

The reaction time offset may be determined by using a longest duration of one or more durations between a plurality of inputs (e.g., tactile inputs) that are received. For example, if the plurality of inputs comprises three inputs in which there is a duration of 0.3 seconds between the first input and the second input, and a duration of 0.5 seconds between the second input and the third input.

In step 935, user input information may be generated. The user input information may indicate a user's preferred way of responding to IVR messages and the reaction time offset based on the user's reaction time. The user input information may comprise a type of input (e.g., the second type of input) that may be used to select an option and/or the reaction time offset. The user input information may be used when a selection time is determined (e.g., the selection time that is determined in step 1030 of the method 1000). For example, the user input information may be generated and stored on a computing device (e.g., mobile device 125) that outputs the audio message and receives the second type of input.

Figure 10:
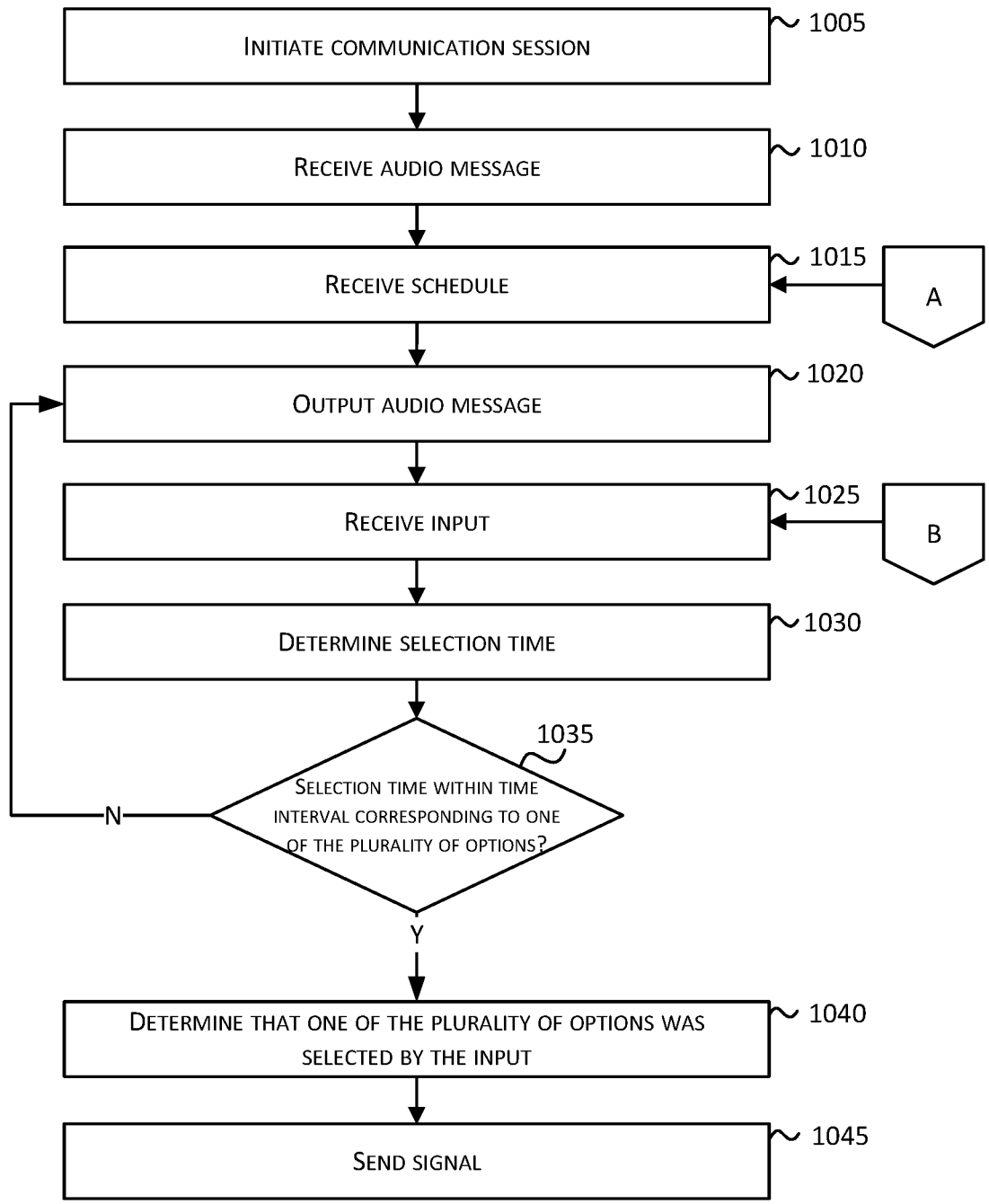
FIG. 10 is a flow chart showing an example method for selecting interactive voice response options.

FIG. 10 is a flow chart showing an example method for selecting interactive voice response options. The method 1000 may, for example, be performed by a mobile device 125 that is used to place a call that is answered by an IVR system that is configured to receive selections of options via a first type of input that the mobile device 125 may provide after receiving a different second type of input. The steps of the example method 1000 may be performed by any device described herein, including one or more mobile devices 125. Further, any part of the steps of the method 1000 may be performed as part of the method 800, the method 900, and/or the method 1100. One, some, or all steps of the example method 1000 may be omitted, performed in other orders, and/or otherwise modified, and/or one or more additional steps may be added.

In step 1005, a communication session with an IVR system (e.g., the IVR server 122) may be initiated. The IVR system may be configured to send an audio message (e.g., the audio message received in step 805 of the method 800) and/or a schedule (e.g., the schedule generated in step 820 of the method 800) after a communication session is initiated by the computing device. For example, a user may use a computing device (e.g., mobile device 125) to place a telephone call to a call center and thereby initiate a communication session between the computing device and an IVR system (e.g., the IVR server 122) of the call center. In response to receiving the call from the computing device, the IVR system may send the audio message and/or the schedule to the computing device. For example, after receiving the telephone call from the computing device an IVR system may send the audio message and/or the schedule to the computing device via a communications network (e.g., the communications network 100). The communication session may comprise a SIP communication session, a TCP/IP session, or any type of session that may be used for communication between two computing devices.

Network latency information comprising the time it takes for a computing device (e.g., mobile device 125) to send information to an IVR system (e.g., IVR server 122) may be determined. The latency information may comprise a duration between the computing device initiating the communication session in step 1005 and receiving the audio message in step 1010 or receiving the schedule in step 1015. Further, the latency information may be used to account for the lag between the time an input is received by a computing device and sent to an IVR system.

In step 1010, the audio message may be received. The audio message (e.g., the audio message of step 805 of the method 800) may comprise an indication of a plurality of options that are selectable via an input (e.g., a first type of input). For example, the audio message may indicate two (2) options including a first option to enter a specific extension and a second option to hear more choices. Further, the audio message may be received by a computing device (e.g., mobile device 125) from an IVR system (e.g., the IVR system that sent the audio message in the step 1005) that answered a call from the computing device (e.g., the computing device that initiated the communication session in step 1005).

The audio message may be received separately from the schedule. For example, after the computing device (e.g., mobile device 125) initiates the communication session, the audio message may be played over an audio connection of the communication session, and the schedule may be sent during signaling setup for the communication session (or sent via a different data channel from a data channel carrying the audio connection). Alternatively, the audio message may include metadata that includes the schedule such that the schedule is received together with the audio message.

In step 1015, the schedule may be received. The schedule may indicate a plurality of time intervals corresponding to the plurality of options of the audio message. For example, the schedule may indicate two time intervals corresponding to the two options of the audio message received in step 1010. The first option may correspond to a first time interval with a duration of 4.0 seconds in the audio message, and the second option may correspond to a second time interval with a duration of 5.0 seconds in the audio message.

The schedule may be received as a result of placing a telephone call to a help desk and receiving the schedule from the IVR system (e.g., the IVR system that sent the schedule in the step 1005) when the call is answered by the IVR system of the help desk. Further, the computing system that generated the schedule (e.g., the computing system that generated the schedule in step 820 of the method 800) may send the schedule to a computing device (e.g., mobile device 125) that receives and uses the schedule.

In step 1020, the audio message may be outputted. The audio output may be outputted via the computing device that received the audio message. For example, the audio message that includes the audio segments 406 may be played aloud from the loudspeakers of the computing device 400. The audio message may be outputted via an audio output device that is different from the computing device that receives the audio message. For example, the audio message may be received by a computing device (e.g., mobile device 125) that sends the audio message to a wireless speaker or earphones that output the audio message.

In step 1025, during output of the audio message, an input may be received. The input may comprise a second type of input that is different from the first type of input. For example, during output of the audio message, a second type of input (e.g., shaking the computing device) that is different from the first type of input (e.g., pressing a number of a numeric keypad on a user interface) may be received. The second type of input may be based on the user input information generated in step 935, which indicates the alternative manner in which the user prefers to respond to IVR messages. For example, the user input information may indicate that the user prefers to tap the back of their computing device (e.g., mobile device 125) instead of pressing numeric buttons on a keypad. The computing device may then use one or more tactile sensors to detect the second type of input comprising a tap on the back of the computing device. The second type of input may be received by a different device than the device that the audio message indicates should receive the first type of input. For example, if the audio message requests that the user press a numeric keypad button, the second type of input may comprise tapping wireless earphones that the user is using to make the call. Further, the audio message outputted in step 1020 may have prompted a user to contact a numeric keypad interface of the computing device and the second type of input may comprise tapping the computing device without tapping the numeric keypad interface. By way of further example, if the audio message prompted a user to select one of the plurality of options via a first type of input comprising pressing a numeric keypad interface of the computing device, the second type of input may comprise tapping a portion of the computing device that does not include the numeric keypad interface.

The input may comprise any input described herein. For example, the input may comprise a tactile input (e.g., tapping the computing device, knocking on the computing device, shaking the computing device, or rubbing the computing device) or a sonic input (e.g., an utterance). By way of further example, if the audio message comprised a prompt indicating "SELECT AN OPTION BY PROVIDING AN INPUT WHEN YOU HEAR THE OPTION YOU WISH TO SELECT" the input received may comprise tapping the back of the computing device (e.g., mobile device 125) or shaking the computing device. The computing device may then use one or more tactile sensors to detect the input that was received. Further, user input information (e.g., the user input information of step 935) may be used to determine the type of input that may be received.

In step 1030, a selection time may be determined based on a time of the input. The input may comprise a second type of input. For example, the selection time may be determined based on a time of the second type of input. The time of the input (e.g., the second type of input) may be based on a duration between a time the audio message starts being outputted and a time the input (e.g., the second type of input) is detected. For example, the input time 618 in FIG. 6A may represent a time of the second type of input that is a sum of the total time of the time interval 612 plus the partial time of the time interval 614.

Determination of the selection time may be based on user input information comprising a reaction time offset. For example, a computing device (e.g., mobile device 125) may access the user input information comprising the reaction time offset determined in step 930 of the method 900. The reaction time offset may then be subtracted from the time of the input (e.g., the second type of input) that was determined. For example, the selection time 620 shown in FIG. 6B may be determined by subtracting the reaction time offset from the input time 618 at which the second type of input was detected.

Determination of the selection time may be based on network latency information comprising a latency associated with communicating the audio message via a network. For example, the network latency information determined in step 1005 may be used to determine that communication with an IVR system introduces a delay of 50 milliseconds. If the selection time is determined by the IVR system, the selection time may be determined by subtracting the latency associated with communicating an input (e.g., the second type of input) to the IVR system from the time of the input (e.g., the second type of input).

Determination of the selection time may be based on processing latency information comprising a latency associated with the computing device processing input (e.g., the second type of input) or determining the selection time. For example, different computing devices may include different processing capabilities and may take different amounts of time to process the second type of the input. The selection time may be determined by subtracting the latency associated with processing the second type of input from the time of the second type of input.

Determination of the selection time may be based on input latency information comprising a latency associated with the computing device detecting input (e.g., the second type of input). For example, different computing devices may include sensors that use different amounts of time to detect input. The selection time may be determined by subtracting the input latency that results from the computing device detecting the second type of input.

In step 1035, based on a determination that the selection time is within a time interval corresponding to one of the plurality of options of the audio message, step 1040 may be performed. For example, if the audio message comprises three options (e.g., Option 1, Option 2, and Option 3) corresponding to three time intervals that are contiguous (e.g., Option 1 is immediately followed by Option 2, and Option 2 is immediately followed by Option 3), each time interval having a duration of two seconds, and the selection time is at the three second mark of the audio message, the selection time may be determined to be within the time interval corresponding to the second option.

Based on a determination that the selection time is not within the time interval corresponding to one of the options of the audio message, step 1020 may be performed (e.g., the audio message may be outputted again) or the method 1000 may end. For example, if the audio message comprises four options (e.g., Option 1, Option 2, Option 3, and Option 4) corresponding to four time intervals that are contiguous and have a duration of two seconds each (e.g., a total time of eight seconds), and the selection time is at the fifteen second mark of the audio message (after the end of the time interval for the fourth option), the selection time may be determined not to be within a time interval corresponding to one of the options of the audio message.

In step 1040, the option that corresponds to the time interval that comprises the selection time may be determined to have been selected by the input. The input may comprise the second type of input. For example, one of the plurality of options may be determined to have been selected by the second type of input. The selection time may be compared to the plurality of time intervals and the time interval the selection time is within may be determined to have been selected by the second type of input. By way of further example, the selection time 722 corresponding to the time interval 714 may be determined to comprise selection of the IVR option 704 (Option 2).

In step 1045, a signal indicating an input to select one of the plurality of options may be sent. The signal may indicate a first type of input to select one of the options. For example, a signal indicating a first type of input (e.g., a DTMF signal) to select the one of the options may be sent. If the option that was determined to have been selected in step 1040 was an option to call a help desk, a computing device may send a signal to the IVR system that sent the audio message. The signal may comprise a DTMF signal that corresponds to the option that was selected by the second type of input. For example, selection of a third option by the first type of input may comprise an input of the number three (3) to a numeric keypad that causes a DTMF signal associated with the number three (3) to be sent to the IVR system. The schedule may indicate that the third option corresponds to a DTMF signal for the number three (3) and may cause the computing device to send the DTMF signal for the number three (3) when the second type of input corresponding to the third option is selected. Further, the signal may comprise one or more instructions from the computing device for the IVR system perform an action such as sending a text message or e-mail. For example, selection of an option to confirm a voice call may result in the generation of a signal to instruct the IVR system that answered the call to send a text message or e-mail confirming an appointment that was scheduled during the call. If the computing device comprises a numeric keypad interface, the signal may comprise a DTMF signal corresponding to the one of the options that was selected by a second type of input comprising pressing a portion of the computing device without pressing the numeric keypad interface.

The signal may be sent to the sender of the audio message (e.g., the IVR server 122). For example, if the audio message indicated three options (e.g., Option 1, Option 2, and Option 3) and Option 2 was selected, a signal comprising an indication that Option 2 was selected (e.g., a numeric code indicating that Option 2 was selected) may be generated by the computing device (e.g., mobile device 125) that was used to select one of the options. The signal may comprise data that may be encoded in a variety of formats that may be decoded by the sender of the audio message to trigger some action (e.g., transferring a call to another extension). The computing device, which may be upstream of the IVR system, may then send the signal indicating the option (e.g., Option 2) that was selected to the IVR system.

Further, the signal may comprise a SIP message indicating a transfer target corresponding to the one of the plurality of options that was selected by the second type of input. For example, the signal may comprise a SIP REFER message that may be used to transfer a call to a transfer target corresponding to one of the plurality of options. Further, the signal may comprise an inter asterisk eXchange (IAX) trunks message, or any data that indicates the input to select the one of the options (e.g., data including a number associated with the option that was selected).

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device and from a server, an audio message comprising an indication of a plurality of options that are selectable via a first type of input;
receiving, from the server, a schedule indicating a plurality of time intervals corresponding to the plurality of options of the audio message;
outputting the audio message;
receiving, during output of the audio message, a second type of input that is different from the first type of input;
determining, based on a time of the second type of input, a selection time;
based on determining that the selection time is within one of the plurality of time intervals corresponding to one of the plurality of options of the audio message:
determining that the one of the plurality of options was selected by the second type of input; and
sending a signal indicating selection of the one of the plurality of options.

2. The method of claim 1, wherein the selection time is based on a duration between a time the audio message starts being outputted and a time the second type of input is detected.

3. The method of claim 1, wherein the selection time is based on user input information comprising a reaction time offset associated with a user of the computing device.

4. The method of claim 1, wherein the selection time is based on network latency information comprising a latency associated with communicating the audio message via a network.

5. The method of claim 1, wherein the schedule indicates one or more time intervals of silence in the audio message, and wherein the plurality of time intervals that correspond to the plurality of options follow or are preceded by the one or more time intervals of silence.

6. The method of claim 1, wherein the second type of input is based on user input information comprising the second type of input.

7. The method of claim 1, wherein the second type of input comprises a tactile input to a portion of the computing device that is different from a portion of the computing device that receives the first type of input.

8. The method of claim 1, wherein the schedule maps a plurality of different time intervals of the audio message to a plurality of different dual tone multi-frequency (DTMF) signals.

9. The method of claim 1, wherein the computing device comprises a numeric keypad interface, and wherein the signal comprises a DTMF signal corresponding to the one of the plurality of options that was selected by the second type of input comprising pressing a portion of the computing device without pressing the numeric keypad interface.

10. The method of claim 1, wherein the signal is sent to the server that sent the audio message and comprises a session initiation protocol (SIP) message indicating a transfer target corresponding to the one of the plurality of options that was selected by the second type of input.

11. The method of claim 1, wherein the audio message prompts a user to select one of the plurality of options via the first type of input comprising pressing a numeric keypad interface of the computing device, and wherein the second type of input comprises tapping a portion of the computing device that does not include the numeric keypad interface.

12. The method of claim 1, further comprising:
initiating a session initiation protocol (SIP) communication session with an interactive voice response (IVR) system that is configured to receive a signal corresponding to the one of the options selected by the second type of input.

13. A method comprising:
receiving, by a server, an audio message comprising an indication of a plurality of options that are selectable via a first type of input;
based on the audio message, determining a plurality of time intervals that correspond to the plurality of options;
determining that the plurality of options are selectable via a second type of input that is different from the first type of input; and
generating, by the server, a schedule associating the plurality of time intervals to different options of the plurality of options that correspond to the plurality of time intervals.

14. The method of claim 13, wherein the determining the plurality of time intervals that correspond to the plurality of options comprises:
determining, based on application of a silence detection technique to the audio message, a plurality of audio segments of the audio message that correspond to the plurality of options.

15. The method of claim 13, wherein the determining the plurality of time intervals that correspond to the plurality of options comprises:
determining, based on application of an audio segmentation technique to the audio message, a plurality of audio segments of the audio message that correspond to the plurality of options.

16. The method of claim 13, further comprising:
storing the schedule; and
sending the schedule to a user device that outputs the audio message.

17. A method comprising:
receiving, by a computing device and from a server, an audio message comprising an indication of a plurality of options that are selectable via an input;
receiving, from the server, a schedule indicating a plurality of time intervals corresponding to the plurality of options of the audio message;
outputting the audio message;
receiving, during output of the audio message, the input;
determining, based on a time of the input, a selection time;
based on determining that the selection time is within one of the plurality of time intervals corresponding to one of the plurality of options of the audio message:
determining that the one of the plurality of options was selected by the input; and
sending a signal indicating selection of the one of the plurality of options.

18. The method of claim 17, wherein the input comprises tapping the computing device.

19. The method of claim 17, wherein the selection time is based on processing latency information comprising a latency associated with the computing device processing the input or the computing device determining the selection time.

20. The method of claim 17, wherein the selection time is based on input latency information comprising a latency associated with the computing device detecting the input.

\* \* \* \* \*